F. G. & A. E. HARRIS.
STALL FRAME.
APPLICATION FILED JULY 22, 1912.
1,053,031.
Patented Feb. 11, 1913.
2 SHEETS—SHEET 1.
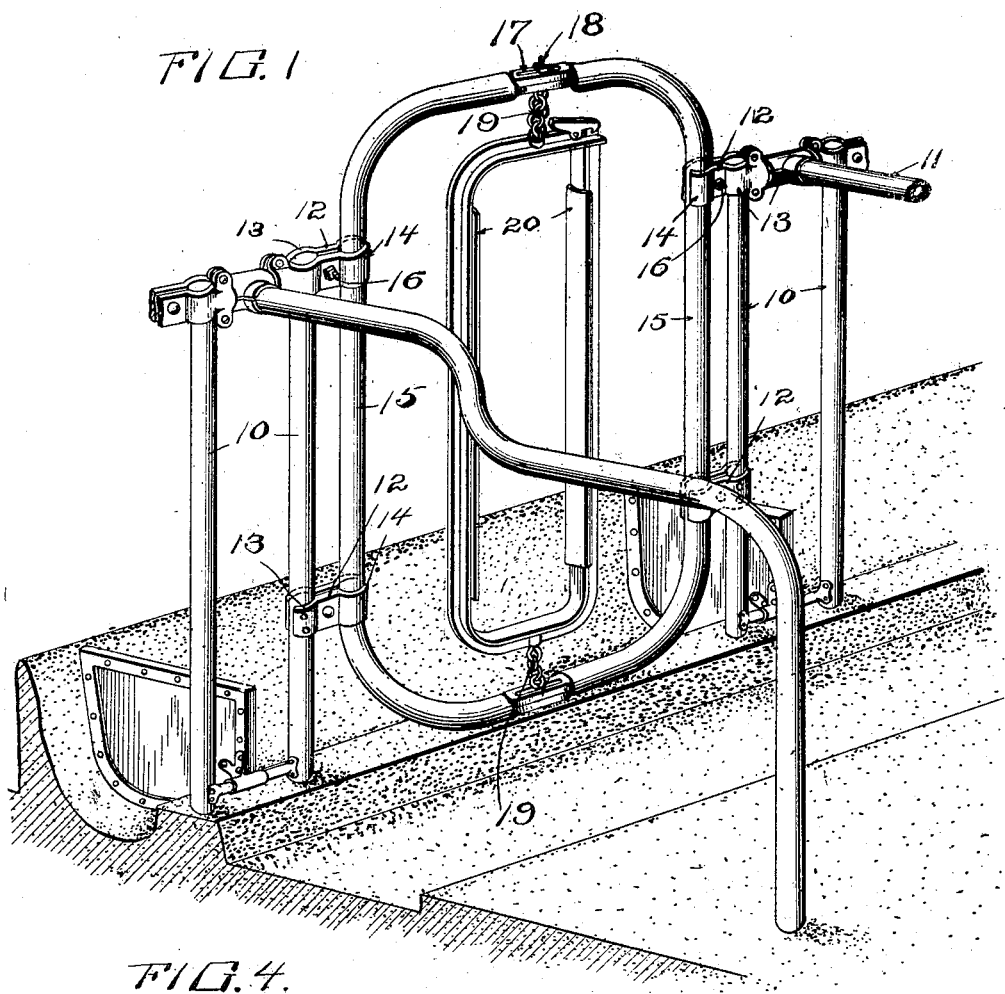
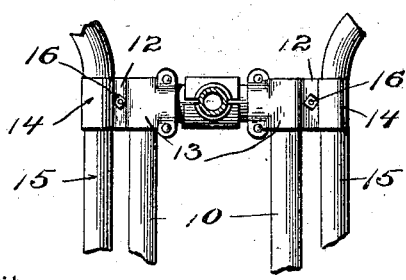

F. G. & A. E. HARRIS.
STALL FRAME.
APPLICATION FILED JULY 22, 1912.
1,053,031.
Patented Feb. 11, 1913.
2 SHEETS—SHEET 2.
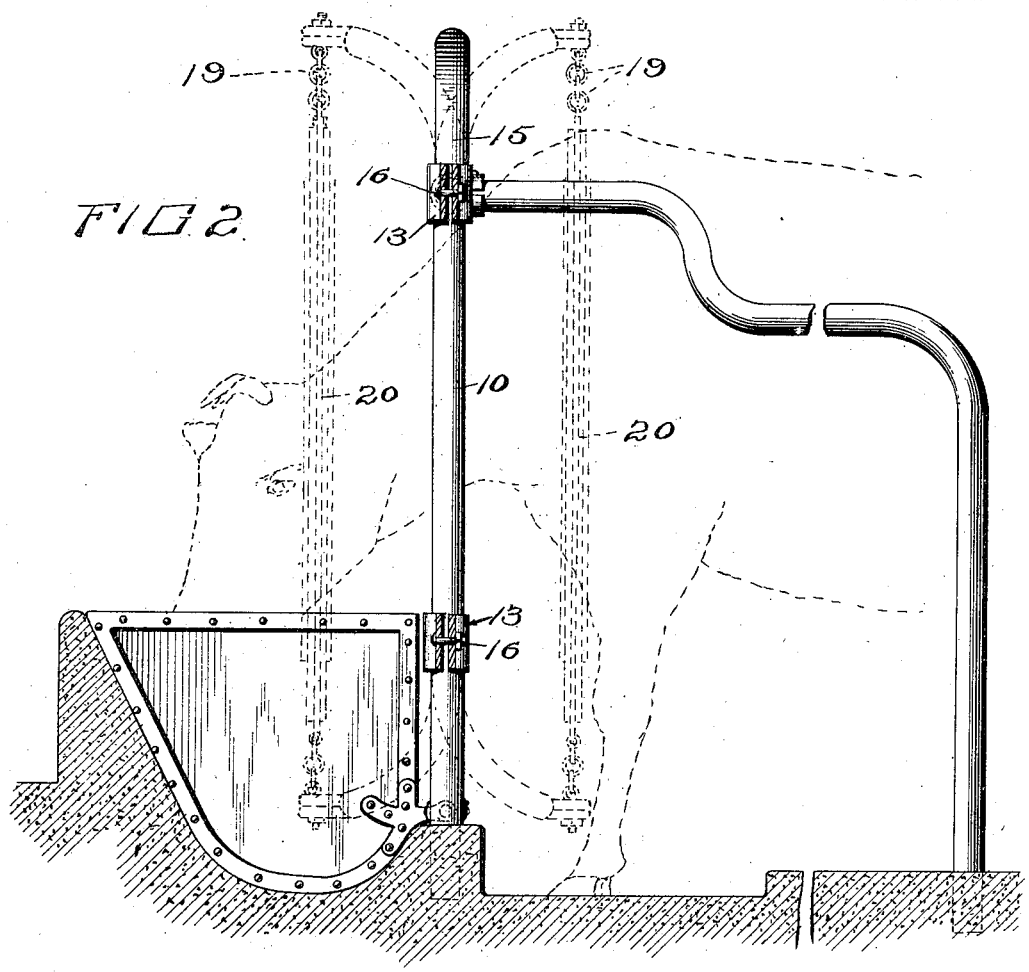
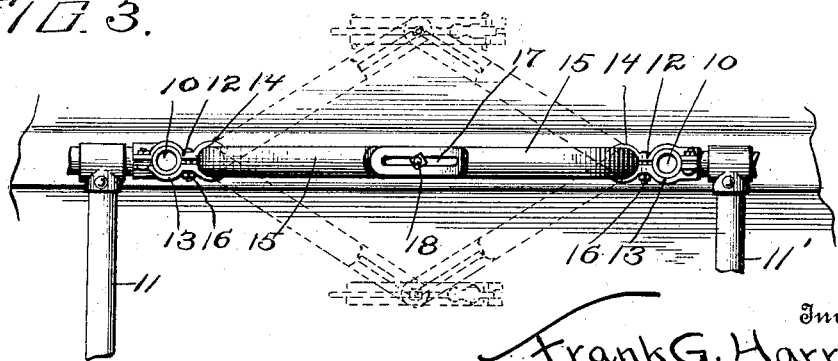
Witnesses
R. S. Trogner.
L. L. Morrill
Inventors
Frank G. Harris and
Augustus E. Harris,
By Mason, Fenwick & Lawrence
Attorneys

UNITED STATES PATENT OFFICE.

FRANK G. HARRIS AND AUGUSTUS E. HARRIS, OF SALEM, OHIO.

STALL-FRAME.

1,053,031.

Specification of Letters Patent. Patented Feb. 11, 1913.

Application filed July 22, 1912. Serial No. 710,920.

*To all whom it may concern:*

Be it known that we, FRANK G. HARRIS and AUGUSTUS E. HARRIS, citizens of the United States, residing at Salem, in the county of Columbiana and State of Ohio, have invented certain new and useful Improvements in Stall-Frames; and we do hereby declare the following to be a full, clear, and exact description of the invention, such as will enable others skilled in the art to which it appertains to make and use the same.

This invention relates to stall frames and has for an object to provide a frame connected with the stall and adapted to carry a stanchion and so constructed as to permit the adjustment of the frame to vary the distance of the stanchion from a given line upon the floor.

A further object of the invention is to provide a frame hinged upon opposite sides to permanent uprights and carrying centrally of such frame a stanchion with means for moving the frame front or back upon its pivots to position the stanchion either front or back of the normal line.

With these and other objects in view the invention comprises certain novel constructions, combinations and arrangements of parts as will be hereinafter more fully described and claimed.

In the drawings:—Figure 1 is a perspective view of the improved stall frame. Fig. 2 is a view of the stall frame in side elevation showing in dotted lines the stanchion and frame moved in opposite directions to the limit of its movement. Fig. 3 is a top plan view of the stanchion frame showing the frame adjustable both front and back of normal. Fig. 4 is a detail view in elevation of the pivoting means.

Like characters of reference indicate corresponding parts throughout the several views.

The improved stall frame which forms the subject matter of this application comprehends the use of uprights 10 and dividers 11 of substantially the usual and ordinary construction, as shown in the drawings or in any preferred form. The uprights 10 carry pivoting and locking members 12 adapted to embrace the uprights as at 13 and also to embrace the stanchion frame as at 14. The stanchion frame comprises two parts 15 engaged as aforesaid at 14, said clamping member being clamped upon the stanchion frame by the bolts and nuts shown at 16. The upper and lower ends of the stanchion frame sections 15 are curved inwardly and provided with slots 17 normally registering and held in adjustment by an eye bolt 18 as shown particularly at Figs. 1 and 3. The eye bolts carry chains 19 to which is suspended a stanchion 20 of substantially the usual and ordinary construction.

It will be apparent that by loosening the nuts upon the eye bolts 18 the sections 15 of the stanchion frame may be moved either forwardly or backwardly, as indicated in dotted lines in Figs. 2 and 3, to secure such forward or rearward adjustment as may be required by the length of the animal secured by such stanchion.

At Figs. 2 and 3 the extreme limits of movement of the stanchion are intended to be shown but it is apparent that any intermediate adjustments may be accomplished as readily and conveniently so that the entire range of adjustment is possible, from the extreme forward movement to the extreme rearward movement.

It is to be understood that the form and construction of the supporting frame or uprights and also the form of the stanchion carried by the adjustable frame, are immaterial to the present invention, the present invention residing in the adjustable frame and the means by which the adjustment is locked and the manner of mounting the stanchion within said adjustable frame.

We claim:—

1. In a stall frame, uprights, a stanchion frame composed of sections slidably connected at their extremities and pivotally and adjustably connected with the uprights, and a stanchion carried within the frame and adjustably movable therewith.

2. In a stall frame, uprights, a stanchion frame comprising upright and integral curved sections, said curved sections overlapping and provided with registering slots, a bolt extending from the slots and adapted to lock the extremities together, a stanchion carried by the bolt and pivoting clamps carried by the uprights and engaging the vertical sections of the stanchion frame for clamping said stanchion frame sections in adjusted position.

In testimony whereof we affix our signatures in presence of two witnesses.

FRANK G. HARRIS.
AUGUSTUS E. HARRIS.

Witnesses:
R. W. CAMPBELL,
WM. WATERWORTH.